(12) United States Patent
Lewis et al.

(10) Patent No.: US 9,440,544 B2
(45) Date of Patent: Sep. 13, 2016

(54) BATTERY MANAGEMENT SYSTEM AND METHOD

(71) Applicant: Columbia Insurance Company, Omaha, NE (US)

(72) Inventors: Ishmal R. Lewis, Calhoun, GA (US); William D. Pierce, Boaz, AL (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 61 days.

(21) Appl. No.: 14/211,997

(22) Filed: Mar. 14, 2014

(65) Prior Publication Data

US 2014/0312831 A1    Oct. 23, 2014

Related U.S. Application Data

(60) Provisional application No. 61/790,455, filed on Mar. 15, 2013.

(51) Int. Cl.
| | | |
|---|---|---|
| *H02J 7/00* | (2006.01) | |
| *B60L 9/00* | (2006.01) | |
| *G01R 31/36* | (2006.01) | |
| *B60L 11/18* | (2006.01) | |

(52) U.S. Cl.
CPC ........ *B60L 11/1822* (2013.01); *B60L 11/1846* (2013.01); *B60L 11/1848* (2013.01); *Y02T 10/7005* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
CPC B60L 11/18; B60L 11/1822; B60L 11/1838; B60L 11/1848
USPC ........................ 320/107, 116; 702/63; 701/22
See application file for complete search history.

(56) References Cited

U.S. PATENT DOCUMENTS

| | | | |
|---|---|---|---|
| 4,413,219 A | 11/1983 | Ducharme et al. | |
| 4,983,903 A | 1/1991 | Bae et al. | |
| 5,057,762 A | 10/1991 | Goedken et al. | |
| 5,548,200 A | 8/1996 | Nor et al. | |
| 5,574,354 A | 11/1996 | Kohchi | |
| 5,588,005 A | 12/1996 | Ali et al. | |
| 5,654,623 A | 8/1997 | Shiga et al. | |
| 5,694,019 A * | 12/1997 | Uchida ................. | H01M 10/46 320/106 |

(Continued)

FOREIGN PATENT DOCUMENTS

| | | |
|---|---|---|
| JP | 59031201 A | 2/1984 |
| JP | 59108282 A | 6/1984 |

(Continued)

*Primary Examiner* — M'Baye Diao
(74) *Attorney, Agent, or Firm* — Ballard Spahr LLP

(57) ABSTRACT

A system and method for managing batteries having a plurality of batteries, each battery comprises a battery ID attached thereto; a plurality of chargers, each charger comprising a charger ID attached thereto and being configured to selectively charge a battery; a plurality of vehicles, each vehicle comprises a vehicle ID attached thereto; a plurality of ID sensor units, each ID sensor unit configured to read the respective battery, charger and vehicle IDs; and a management server coupled to plurality of ID sensor units for selective control and management of identified batteries.

19 Claims, 7 Drawing Sheets

(56) References Cited

U.S. PATENT DOCUMENTS

| | | | |
|---|---|---|---|
| 5,844,400 A * | 12/1998 | Ramsier | H02J 7/0045 320/106 |
| 5,895,440 A | 4/1999 | Proctor et al. | |
| 5,951,229 A * | 9/1999 | Hammerslag | B60K 1/04 104/34 |
| 6,084,523 A | 7/2000 | Gelnovatch et al. | |
| 6,184,656 B1 | 2/2001 | Karunasiri et al. | |
| 6,236,186 B1 * | 5/2001 | Helton | H01M 10/42 320/106 |
| 6,255,801 B1 | 7/2001 | Chalasani | |
| 6,489,743 B1 | 12/2002 | Alzieu et al. | |
| 7,045,989 B2 | 5/2006 | Sakakibara et al. | |
| 7,253,586 B2 * | 8/2007 | Kangas | H02J 7/0073 320/124 |
| 7,258,184 B2 | 8/2007 | Shorney et al. | |
| 7,598,880 B2 | 10/2009 | Powell | 340/636.1 |
| 7,663,344 B2 | 2/2010 | Le Gall et al. | |
| 7,872,449 B2 | 1/2011 | Gutlein | |
| 7,928,735 B2 | 4/2011 | Huang et al. | |
| 8,106,632 B2 * | 1/2012 | Delaille | H02J 7/0013 320/132 |
| 8,131,488 B2 * | 3/2012 | Kagawa | G06F 19/327 702/63 |
| 8,164,300 B2 | 4/2012 | Agassi et al. | |
| 8,164,307 B2 | 4/2012 | Cargonja et al. | |
| 8,207,740 B2 * | 6/2012 | Lin | H01M 10/441 180/207.3 |
| 2003/0040873 A1 * | 2/2003 | Lesesky | G01R 31/007 702/57 |
| 2004/0164706 A1 * | 8/2004 | Osborne | H02J 7/0018 320/116 |
| 2007/0182576 A1 * | 8/2007 | Proska | G01R 31/3624 340/636.1 |
| 2008/0079592 A1 | 4/2008 | Latinis | |
| 2008/0319666 A1 * | 12/2008 | Petrov | G01C 21/005 701/469 |
| 2010/0052614 A1 * | 3/2010 | Mariels | H02J 7/0016 320/116 |
| 2010/0114800 A1 | 5/2010 | Yasuda et al. | |
| 2011/0258471 A1 | 10/2011 | Daniel et al. | |
| 2012/0133337 A1 | 5/2012 | Rombouts et al. | |
| 2012/0191578 A1 | 7/2012 | Katagishi | 705/28 |
| 2012/0313562 A1 * | 12/2012 | Murao | B60L 3/0046 318/139 |
| 2013/0093384 A1 * | 4/2013 | Nyu | G01R 31/3606 320/107 |
| 2013/0221919 A1 * | 8/2013 | Gallegos | B60L 3/0046 320/109 |
| 2013/0226320 A1 * | 8/2013 | Berg-Sonne | G05B 15/02 700/90 |

FOREIGN PATENT DOCUMENTS

| | | |
|---|---|---|
| JP | 7303334 A | 11/1995 |
| JP | 2007182310 A | 7/2007 |
| JP | 2010259252 A | 11/2010 |
| JP | 2011096233 A | 5/2011 |
| JP | 5227669 B2 | 7/2013 |
| JP | 5294147 B2 | 9/2013 |
| WO | WO 2010/013212 | 2/2010 |

* cited by examiner

BATTERY AVG DISCHARGE REPORT

REPORT START DATE: 9/28/2011    REPORT END DATE: 2/15/2012

| AVERAGE DISCHARGE DURATION | BATTERY ID | SIZE |
|---|---|---|
| 3 HOURS, 25 MINS | 495 | 21 |
| 3 HOURS, 26 MINS | 502 | 21 |
| 4 HOURS, 47 MINS | 524 | 21 |
| 4 HOURS, 59 MINS | 520 | 21 |
| 5 HOURS, 30 MINS | 512 | 21 |
| 5 HOURS, 31 MINS | 499 | 21 |
| 6 HOURS, 0 MINS | 517 | 21 |
| 6 HOURS, 2 MINS | 511 | 21 |
| 6 HOURS, 5 MINS | 498 | 21 |
| 6 HOURS, 22 MINS | 496 | 21 |
| 6 HOURS, 26 MINS | 519 | 21 |
| 6 HOURS, 38 MINS | 509 | 21 |
| 6 HOURS, 41 MINS | 497 | 21 |
| 6 HOURS, 46 MINS | 500 | 21 |
| 6 HOURS, 47 MINS | 523 | 21 |
| 6 HOURS, 52 MINS | 506 | 21 |
| 7 HOURS, 1 MINS | 514 | 21 |
| 7 HOURS, 14 MINS | 494 | 21 |
| 7 HOURS, 14 MINS | 503 | 21 |
| 7 HOURS, 36 MINS | 491 | 21 |
| 8 HOURS, 7 MINS | 510 | 21 |
| 3 HOURS, 42 MINS | 471 | 25 |
| 3 HOURS, 55 MINS | 390 | 25 |

FIG. 6A

LIFT TRUCK AVG DISCHARGE REPORT

REPORT START DATE: 9/28/2011    REPORT END DATE: 2/15/2012

| AVERAGE DISCHARGE DURATION | LIFT TRUCK ID | SIZE |
|---|---|---|
| 2 HOURS, 20 MINS | 819 | 21 |
| 5 HOURS, 24 MINS | 810 | 21 |
| 5 HOURS, 44 MINS | 802 | 21 |
| 6 HOURS, 5 MINS | 808 | 21 |
| 7 HOURS, 4 MINS | 823 | 21 |
| 8 HOURS, 29 MINS | 814 | 21 |
| 4 HOURS, 18 MINS | 1450 | 25 |
| 4 HOURS, 47 MINS | 1451 | 25 |
| 4 HOURS, 48 MINS | 2 | 25 |
| 5 HOURS, 24 MINS | 964 | 25 |
| 5 HOURS, 43 MINS | 754 | 25 |
| 5 HOURS, 47 MINS | 1262 | 25 |
| 5 HOURS, 47 MINS | 16 | 25 |
| 5 HOURS, 52 MINS | 1268 | 25 |
| 6 HOURS, 50 MINS | 965 | 25 |
| 7 HOURS, 15 MINS | 1269 | 25 |
| 7 HOURS, 34 MINS | 755 | 25 |
| 3 HOURS, 22 MINS | 1263 | 27 |
| 5 HOURS, 14 MINS | 5 | 27 |
| 6 HOURS, 47 MINS | 1599 | 27 |
| 7 HOURS, 13 MINS | 2057 | 27 |
| 7 HOURS, 16 MINS | 3 | 27 |
| 7 HOURS, 48 MINS | 4 | 27 |

FIG. 6B

BATTERY AVG CHARGE REPORT

REPORT START DATE: 9/28/2011    REPORT END DATE: 2/15/2012

| AVERAGE CHARGE DURATION | BATTERY ID | SIZE |
|---|---|---|
| BATTERY NOT USED | 517 | 21 |
| 1 DAYS, 13 HOURS, 8 MINS | 494 | 21 |
| 1 DAYS, 13 HOURS, 52 MINS | 509 | 21 |
| 1 DAYS, 14 HOURS, 10 MINS | 497 | 21 |
| 1 DAYS, 15 HOURS, 40 MINS | 491 | 21 |
| 1 DAYS, 15 HOURS, 55 MINS | 514 | 21 |
| 1 DAYS, 18 HOURS, 21 MINS | 520 | 21 |
| 1 DAYS, 22 HOURS, 1 MINS | 498 | 21 |
| 1 DAYS, 22 HOURS, 41 MINS | 512 | 21 |
| 2 DAYS, 0 HOURS, 3 MINS | 511 | 21 |
| 2 DAYS, 0 HOURS, 15 MINS | 510 | 21 |
| 2 DAYS, 1 HOURS, 3 MINS | 499 | 21 |
| 2 DAYS, 2 HOURS, 36 MINS | 523 | 21 |
| 2 DAYS, 3 HOURS, 54 MINS | 519 | 21 |
| 2 DAYS, 4 HOURS, 28 MINS | 500 | 21 |
| 2 DAYS, 6 HOURS, 39 MINS | 503 | 21 |
| 2 DAYS, 10 HOURS, 43 MINS | 496 | 21 |
| 2 DAYS, 18 HOURS, 8 MINS | 495 | 21 |
| 2 DAYS, 19 HOURS, 40 MINS | 524 | 21 |
| 3 DAYS, 16 HOURS, 19 MINS | 502 | 21 |
| 5 DAYS, 8 HOURS, 29 MINS | 506 | 21 |
| 2 DAYS, 0 HOURS, 40 MINS | 471 | 25 |
| 2 DAYS, 5 HOURS, 12 MINS | 436 | 25 |

OVERALL AVERAGE CHARGE TIME

REPORT START DATE: 9/28/2011    REPORT END DATE: 2/15/2012

| SIZE | AVERAGE CHARGE DURATION |
|---|---|
| 21 | 2 DAYS, 4 HOURS, 23 MINS |
| 25 | 2 DAYS, 18 HOURS, 44 MINS |
| 27 | 1 DAYS, 18 HOURS, 57 MINS |

PERCENTAGE OF TIME CORRECT BATTERY CHOSEN FIRST SHIFT

REPORT START DATE: 9/28/2011    REPORT END DATE: 2/15/2012

BATTERY MANAGEMENT SYSTEM AND METHOD

CROSS REFERENCE TO RELATED APPLICATION

This application claims the benefit of U.S. Provisional Application No. 61/790,455, filed Mar. 15, 2013, which is hereby incorporated herein by reference in its entirety.

BACKGROUND

1. Field of the Invention

Implementations described herein relate to a battery management system for managing the charging and service life of batteries. More particularly, in one aspect the invention relates to system and methods for managing a fleet of industrial batteries, vehicles, and chargers on a facility and corporate scale.

2. Related Art

Management of a battery is typically performed by monitoring the voltage at its terminals, discharging of the battery being for example interrupted at a low voltage threshold and charging thereof being interrupted at a high voltage threshold. Such a system is depicted in FIG. 1A. Generally, a battery that has reached one of these two limit voltages is disconnected in order to protect it, respectively, from overcharging or from extensive discharging which could damage the battery irreversibly. One skilled in the art will appreciate that, although it is fully charged, a re-chargable battery presents a decrease of its capacity with time and use. This decrease is a function of the conditions of use of the battery and its extent is generally difficult to evaluate without measuring the battery capacity. In numerous applications, a battery is considered to be defective and needing replacement when its capacity drops below 80% of its nominal or initial capacity.

In order to improve battery management and use fewer batterys to service a given number of vehicles and as shown in FIG. 1B, installations use a plurality of rechargeable batteries that collectively are referred to as a battery bank. Typically, the batteries of a battery bank system are recharged simultaneously or successively so as to keep them permanently charged. A conventional battery management system and associated battery management database are illustrated in FIGS. 2A and 2B, respectively. Although such management has the advantage of being simple to implement, opportunities exist to improve management of a battery bank that can ensure satisfactory operation of the battery bank system and optimize the service time of each battery of the battery bank and, thus, the cost and service rendered to the user.

Accordingly, a need exists for improved systems and methods for managing a fleet of industrial batteries, as well as associated vehicles and chargers, on a facility and corporate scale.

SUMMARY OF THE INVENTION

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Implementations described herein relate to systems and methods for monitoring, improving and/or controlling systematic use of vehicle batteries in a facility or across an organization.

In some aspects, a battery management system comprises a plurality of batteries, each battery comprising a battery ID attached thereto; a plurality of chargers, each charger comprising a charger ID attached thereto and being configured to selectively charge a battery; a plurality of vehicles, each vehicle comprising a vehicle ID attached thereto; and a plurality of ID sensor units, each ID sensor unit configured to read the respective battery, charger and vehicle IDs; and a management server coupled to the plurality of ID sensor units. The management server is programmed or otherwise configured to receive information sent from each of the plurality of chargers regarding the number of charging cycles for a battery associated with the battery ID; cumulatively sum the received number of charging cycles for each battery ID; associating the battery ID with the cumulatively summed number of chargings and allow the number of charging cycles to be recorded; and determine that the corresponding battery has reached its useful life limit when the cumulatively summed number of charging cycles has reached a predetermined number for the respective battery ID.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the invention and together with the description, serve to explain the principles of the invention.

FIG. 6A shows one exemplary report generated by the management server of the battery management system. FIG. 6B shows a second exemplary report generated by the management server of the battery management system.

FIG. 7 shows another exemplary report generated by the management server of the battery management system.

DETAILED DESCRIPTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "battery" can include two or more such batteries unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The present invention can be understood more readily by reference to the following detailed description of preferred embodiments of the invention and the examples included therein and to the Figures and their previous and following description.

Figure 1A:
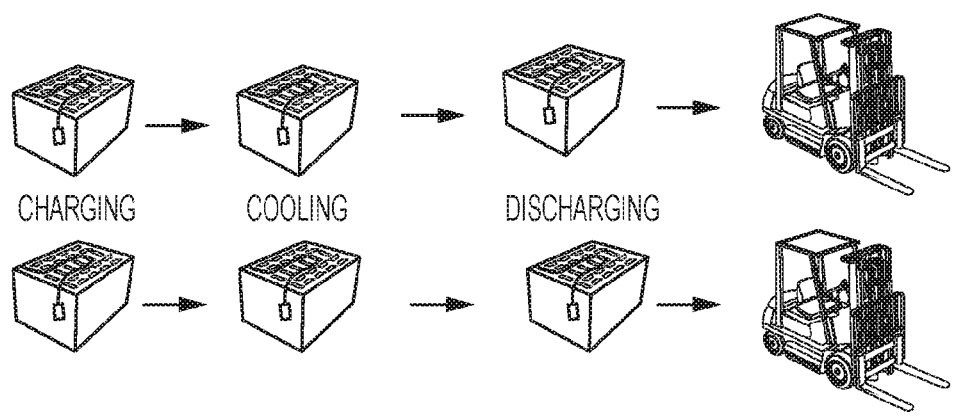
FIG. 1A is a schematic illustrating a conventional battery charging method.
Figure 1B:
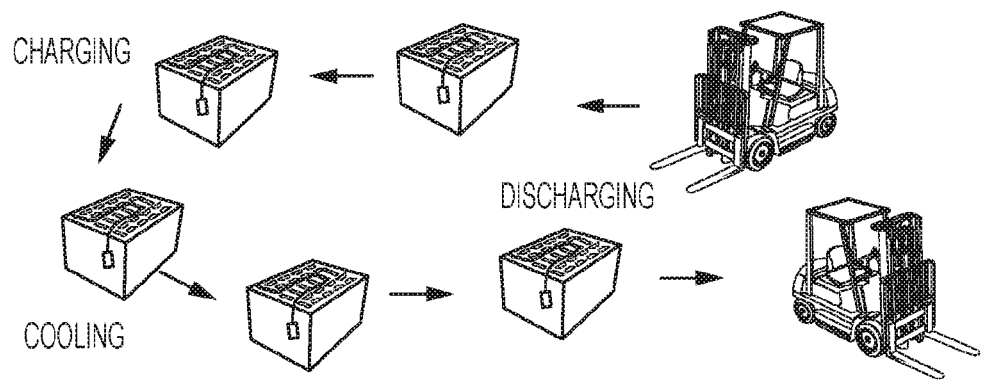
FIG. 1B is a schematic figure illustrating the merits of a conventional battery pooling module over the method illustrated in FIG. 1A. Such merits can include use of fewer batteries to operatively service a given number of vehicles and cost savings.
Figure 2A:
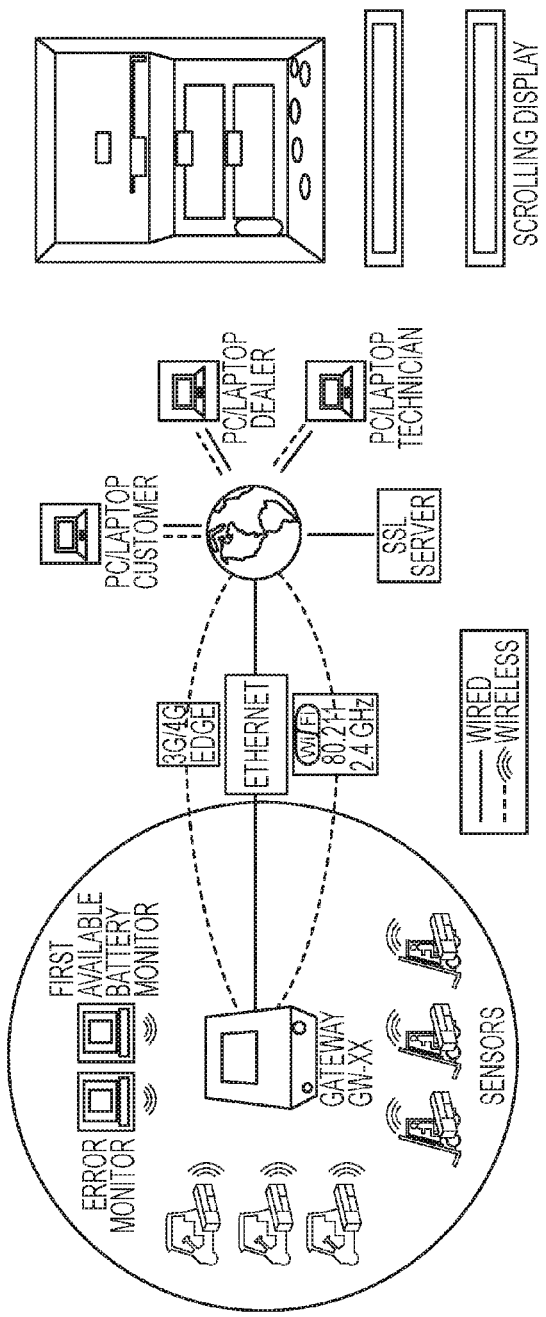
FIG. 2A is a schematic figure illustrating a conventional battery management system and FIG. 2B illustrates an associated conventional battery management database.
Figure 2B:
Figure 3:
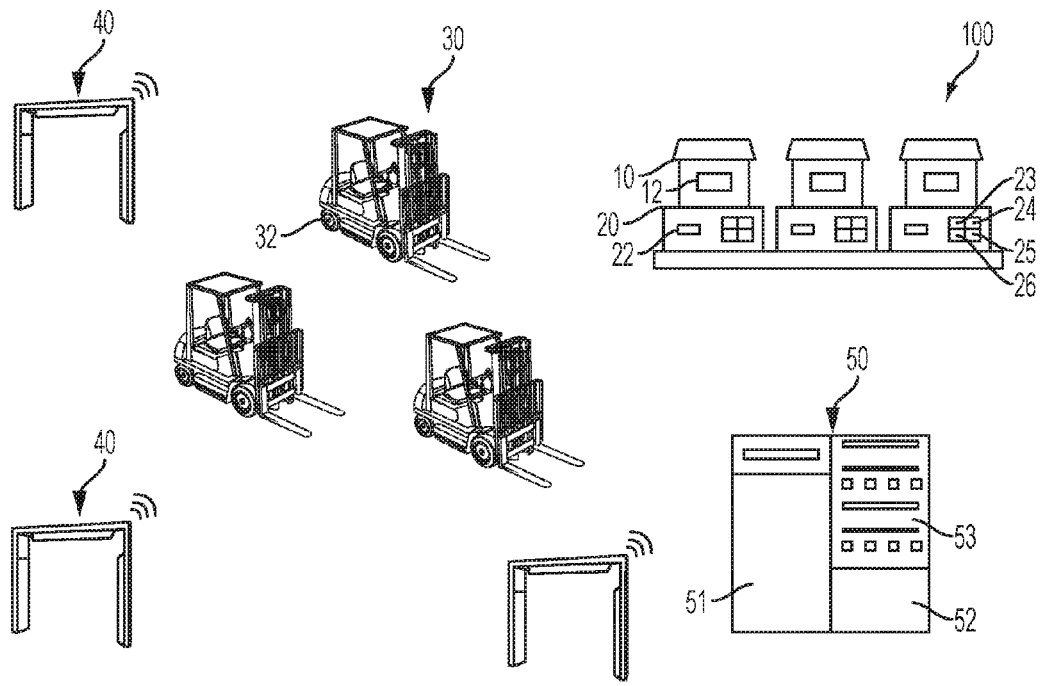
FIG. 3 is a schematic figure illustrating one aspect of a battery management system according to the present disclosure.

In certain aspects, the present disclosure relates to a battery management system 100 for managing the charging and service life of batteries. An exemplary battery management system is illustrated in FIG. 3. The battery management system comprises a plurality of batteries 10, each battery comprising a battery ID 12 attached thereto; a plurality of chargers 20, each charger comprising a charger ID 22 attached thereto and being configured to selectively charge a battery; a plurality of vehicles 30, each vehicle comprising a vehicle ID 32 attached thereto; and a plurality of ID sensor units 40, each ID sensor unit 40 configured to read the respective battery, charger and vehicle IDs; and a management server 50 coupled to the plurality of ID sensor units that is programmed or otherwise configured to receive information sent from each of the plurality of chargers. In certain other aspects, present disclosure relates to methods for managing a fleet of industrial batteries for vehicles, and chargers on a facility and corporate scale.

In one aspect, the batteries 10 can comprise rechargeable batteries which can be recharged by a conventional charger. In one aspect, each battery has an individual battery identification modality 12 (the battery ID) attached thereto in a readable manner. An identification modality can comprise, for example and without limitation, an optical storage means, an RFID tag, and the like. As used throughout this specification, an optical storage means comprises, for example and without limitation, barcodes, matrix codes and the like.

In one aspect, each charger 20 has an individual charger identification modality 22 (the charger ID), attached thereto in a readable manner. In one aspect, it can be similarly contemplated that each vehicle 30 has an individual vehicle identification modality 32 (the vehicle ID), attached thereto in a readable manner. Thus, it is contemplated that each battery, charger, and vehicle in a system has a unique identification modality.

In one aspect, the chargers can be configured to conventionally charge the batteries when electrically coupled thereto. While it is contemplated that a conventional charger can be used, an exemplary charger 20 can comprise one or more of: a battery detection unit 23, a charging unit 24, a communication unit 25, and a control unit 26 configured to control each charger.

In one aspect, the battery detection unit 23 can be configured to detect the battery 10 when it is electrically coupled to or electrically decoupled from the charger 20. For example, in operation, the battery detection unit can be configured to detect a battery 10 being coupled to the charger 20 for a given period of time and can provide the coupling status to the control unit 26 and/or the coupled management server 50.

In another aspect, the charger 20 can charge the battery 10 by supplying DC electricity thereto under the control of the control unit 26. Here, the control unit 26 can be configured to allow the charging unit 24 to measure the voltage and resistance of the battery 10 in order to determine whether the battery 10 satisfies the predetermined requirements necessary for terminating a charge cycle. It is contemplated that operation and desired predetermined requirements can be programmed into the management server 50 and/or the control unit 26. Upon the determination that the battery 10 satisfies the predetermined requirements, the control unit 26 can effect the termination of a charging cycle.

In one aspect, the communication unit 25 can be configured to provide information to the management server 50. In this aspect, under the control of the control unit 26, the communication unit 25 can associate the information indicative of the end of charging the battery 10 with the identification IDs of the battery 10 and charger 20 read by the ID sensor unit 40 and can then send or otherwise process the information to the management server 50. In one aspect, the control unit 26 can be configured to control the communication unit 25 to send the information indicative of the completion of a charging cycle upon meeting the predetermined requirements necessary for terminating a charge cycle. Optionally, the control unit 26 can also control the communication unit 25 to send the information indicative of the completion of a charging cycle in response to the request for polling from the management server 50. In yet another optional aspect, the control unit can be operated to charge the battery 10 mounted to the charger 20, and then end the charging when the battery 10 has satisfied the predetermined requirements necessary for terminating a charging cycle.

In one aspect, a management server 50 can be programmed or otherwise configured to determine the precise location of each of the vehicles, batteries and chargers within each facility. In another aspect, the system can comprise a plurality of batteries 10, a plurality of chargers 20, a plurality of vehicles 30, and a plurality of ID sensor units 40 configured to reqad the respective battery, charger and vehicle IDs and that is operatively coupled management server 50.

In one aspect, a plurality of ID sensor units 40 can be distributed throughout the facility. Optionally, the ID sensor units can be positioned at natural choke points for passage of vehicles to allow for sensing the battery ID and vehicle ID of the paired battery and vehicle. In addition, it is contemplated that the at least one ID sensor unit can be positioned proximate the charger stand to allow for the sensing the battery ID and charger ID of the paired battery and charger.

In one aspect, the management server 50 can be configured to recognize the respective ID of each battery 10, charger 20, and vehicle 30 based on the information received from the ID sensor unit 40. In a further aspect, the management server 50 can be configured to recognize when the respective, batteries, chargers, and vehicles operate in pair relationships, i.e., when a particular battery is operatively coupled to a particular charger or vehicle.

Figure 8:
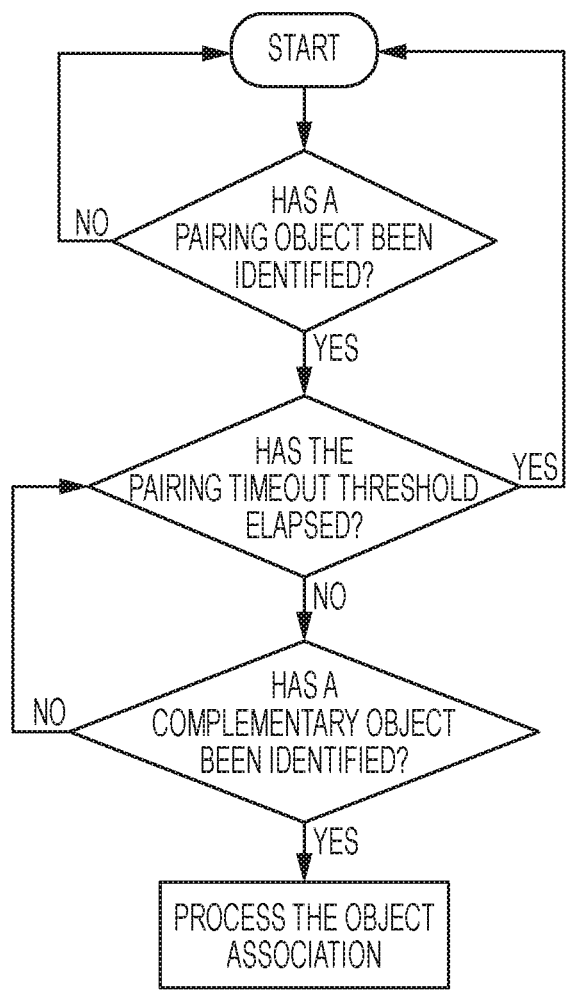
FIG. 8 is a flowchart of one exemplary method for making object associations. It is contemplated that the object can be any one of a battery, a charger or a vehicle.

FIG. 8 depicts a flowchart of one exemplary method for making object associations. It is contemplated that the object can be any one of a battery, a charger or a vehicle. Here, upon activation, the system 100 querys whether an object associated with the system has been identified. If so, the query proceeds to determine whether a selectively preset pairing timeout threshold has elapsed. If not, then the system determines if a complementary object has been identified and, if so, the system processes the object association.

In one exemplary aspect, the management server 50 can be coupled to a plurality of batteries, chargers and vehicles for example, via a network. In this exemplary aspect, the management server 50 can comprise at least one of: a communication unit 51, a recording unit 52, and a management unit 53 and be adapted to analyze and control the plurality of batteries use.

Figure 9:
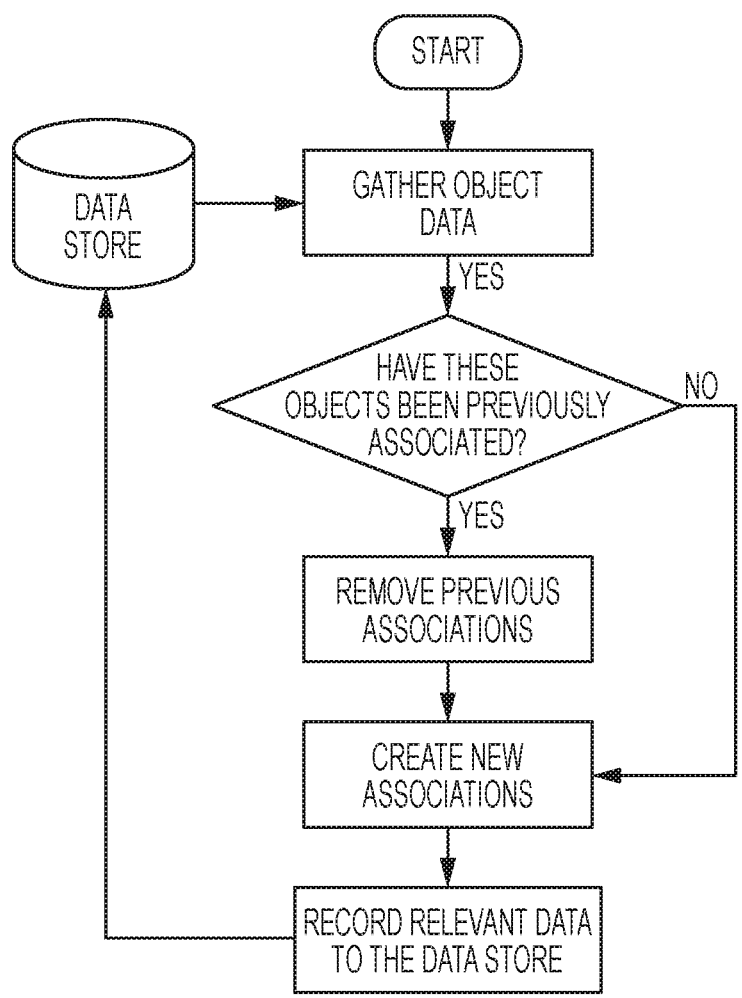
FIG. 9 is a flowchart of one exemplary method for processing object associations. It is contemplated that the object can be any one of a battery, a charger or a vehicle.

In one exemplary aspect, after two objects have been paired, the management system 50 can be configured to gather additional data and process the object associations. FIG. 9. depicts a flowchart of one exemplary method for processing object associations. As above, it is contemplated that the object can be any one of a battery, a charger or a vehicle. Upon activation, the system 100 is prompted to gather object data from the paired objects. The system 100 then querys whether the two objects have been previously associated and, if so, removes the previous association. Next, the system creates a new association and records the relevant data to an associated database.

In one aspect, the communication unit 51 can be adapted to receive the information indicative of the completion of a battery charging cycle for a battery associated with a respective pair of battery and charger IDs and can process that information to the management unit 53.

In another aspect, the charger 20 can be operatively coupled to the management server 50 and can be adapted to send information to the management server for centralized management of the service life of the battery and charge management of the battery. In one aspect, the charger can have a battery sensor ID reader configured to read a battery ID associated with a given battery; and a communication unit 25 configured to associate the read battery ID with the information indicative of completion of charging and transmit the information for centralized management of the service life of the battery.

In one exemplary aspect, upon receiving information indicative of completion of a battery charging cycle for a given battery from a charger 20, the management unit 53 can be configured or otherwise programmed to cumulatively sum, as the number of completed charging cycles, the number of receptions of the information indicative of the end of a charging cycle for each battery ID. Then, the summed number of completed charging cycles of a particular ID battery can be stored in the recording unit of the management system 50. In a further aspect, the management unit 53 can be configured to manage the service life of the battery based on the number of completed charging cycles recorded in the recording unit for a particular battery ID. For example, and without limitation, when a predefined number of charging cycles has been reached, the management unit 53 can indicate that the respective battery has reached its useful life limit and can initiate a protocol for removal and replacement of the battery within the system.

For example, in operation, the management unit 53 of the management server 50 can determine whether the number of charging cycles corresponding to a particular battery ID has reached the predetermined number of charging cycles. If the number of charging cycles has not yet reached the predetermined number, the battery can be determined to have not yet reached its useful life limit, and can be then determined to be in a normal condition and thus usable. On the other hand, if the number of charging cycles corresponding to a particular battery ID has reached the predetermined number of charging cycles, the battery can be determined to have reached its useful life limit and thus indicated for replacement. Optionally, if a given battery is indicated for replacement, the management unit 53 can transmit an indication to the charger to end the charging cycle of the battery.

In a further aspect, it is contemplated that the management server 50 can use the stored data to calculate and compare individual battery performance. In another aspect, the management server can use the stored data to indicate or select the battery to be used in the next battery change based on, for example, a first-in-first-out (FIFO) principle. Further, the management server 50 can analyze individual vehicle and charger performance by monitoring for excessive battery usage. As one skilled in the art will appreciate in light of the present disclosure, excessive battery usage from a vehicle can indicate mechanical operational issues with the vehicle and excessive charge times for a charger can indicate operational issues of the charger. Further, it is contemplated that the management server can store the data gathered in a networked database, thereby allowing for performance tracking of individual battery, vehicle, and charger performance across and among multiple facilities.

Figure 4:
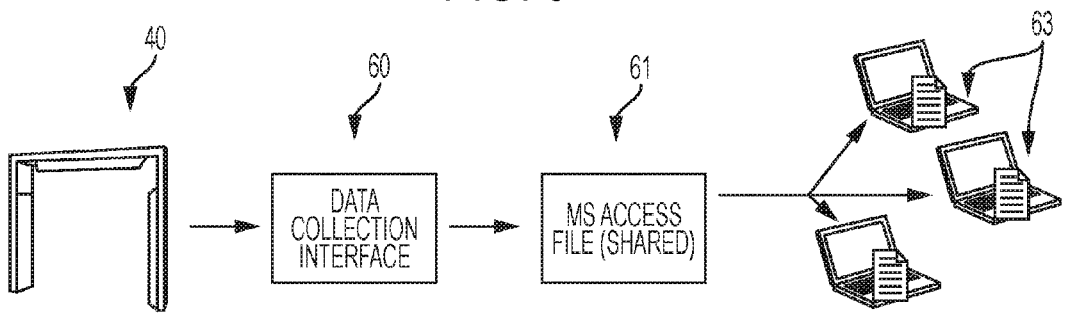
FIG. 4 is a schematic figure illustrating aspects of an exemplary battery management system.
Figure 5:
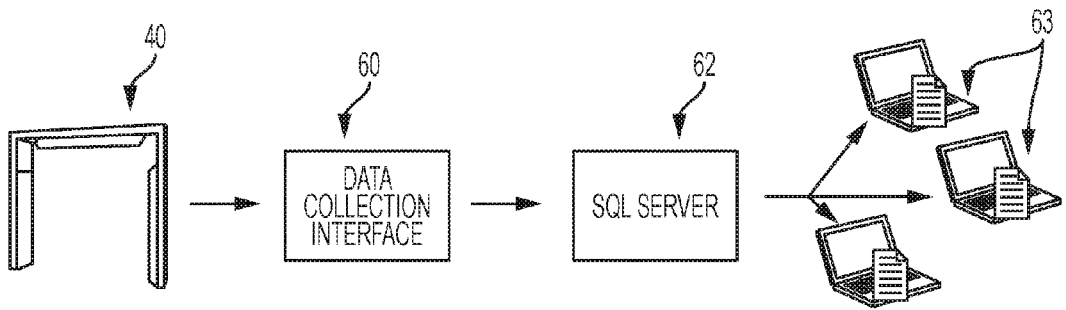
FIG. 5 is a schematic figure illustrating aspects of an exemplary battery management system.

In one aspect illustrated in FIG. 4, each sensor ID unit 40 can be adapted to transmit the read data and associated time to a data collection interface 60; the data collection interface can format and store the data in a file 61 which can then be displayed to system end users via a report 63. In another aspect illustrated in FIG. 5, each sensor ID unit 40 can be adapted to transmit the read data and associated time to a data collection interface 60; the data collection interface can format and store the data in a server 62, e.g., an SQL server, which can then be displayed to system end users via a report 63.

In one aspect illustrated in FIG. 6A, the management server 50 of the battery management system 100 can generate a report 63 listing the average discharge duration and size of each battery. In another aspect illustrated in FIG. 6B, the management server 50 of the battery management system 100 can generate a report 63 listing the average discharge duration and size of batteries associated with a particular vehicle ID. In one aspect illustrated in FIG. 7, the management server 50 of the battery management system 100 can generate a report 63 showing the average charge duration and size for a battery ID, as well as the average charge duration for a particular battery size.

It will be apparent to those skilled in the art that various modifications and variations can be made in the present invention without departing from the scope or spirit of the invention. Other aspects of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A battery management system, comprising:
   a plurality of batteries, each battery comprising a battery ID attached thereto,
   a plurality of chargers, each charger comprising a charger ID attached thereto and being configured to pair with and selectively charge a battery,
   a plurality of vehicles, each vehicle comprising a vehicle ID attached thereto and being configured for pairing with a battery,
   a plurality of ID sensor units, each ID sensor unit configured to read:
      the battery ID of at least one battery of the plurality of batteries;
      the charger ID of at least one charger of the plurality of chargers; and
      the vehicle ID of at least one vehicle of the plurality of vehicles; and
   a management server coupled to the plurality of ID sensor units, wherein the management server is configured for:
      receiving information sent from the plurality of chargers regarding a number of charging cycles for each battery paired with a charger of the plurality of chargers;
      cumulatively summing the received number of charging cycles for the battery ID of each battery of the plurality of batteries;
      associating the battery ID of each battery with the cumulatively summed number of charging cycles and allowing the number of charging cycles to be recorded; and
      for the battery ID of each battery, determining that the corresponding battery has reached its useful life limit when the cumulatively summed number of charging cycles has reached a predetermined number.

2. The battery management system of claim 1, wherein each of the battery IDs, the charger IDs, and the vehicle IDs comprise an optical storage means.

3. The battery management system of claim 2, wherein the optical storage means further comprises a bar code.

4. The battery management system of claim 1, wherein each of the battery IDs, the charger IDs, and the vehicle IDs comprise an RFID tag.

5. The battery management system of claim 1, wherein the charger is configured to selectively charge the battery by supplying DC electricity thereto.

6. The battery management system of claim 1, wherein the charger further comprises a battery detection unit adapted to detect when a battery is operatively coupled thereto.

7. The battery management system of claim 1, wherein the charger further comprises a control unit adapted to measure the voltage and resistance of a battery operatively coupled to the charger.

8. The battery management system of claim 1, wherein the charger further comprises a communication unit adapted to send information to the management server.

9. The battery management system of claim 1, wherein each of the plurality of sensor ID units comprise an optical reader.

10. The battery management system of claim 1, wherein each of the plurality of sensor ID units comprise an RFID reader/writer.

11. The battery management system of claim 1, wherein each of the plurality of sensor ID units are selectively positioned in a facility.

12. The battery management system of claim 11, wherein at least one of the plurality of sensor ID units is positioned proximate a charger stand.

13. A battery management system, comprising:
   a plurality of batteries, each battery comprising a battery ID attached thereto,
   a plurality of chargers, each charger comprising a charger ID attached thereto and being configured to selectively charge a battery,
   a plurality of vehicles, each vehicle comprising a vehicle ID attached thereto and being configured for pairing with a battery,
   a plurality of ID sensor units, each ID sensor unit configured to read:
      the battery ID of at least one battery of the plurality of batteries;
      the charger ID of at least one charger of the plurality of chargers; and
      the vehicle ID of at least one vehicle of the plurality of vehicles; and
   a management server coupled to the plurality of ID sensor units, wherein the management server is configured for receiving information sent from each of the plurality of chargers.

14. The battery management system of claim 13, wherein the management server is further configured to receive information from each of the plurality of sensor ID units.

15. The battery management system of claim 14, where the management server is further configured to associate a battery ID and either a charger ID or a vehicle ID in a pair relationship.

16. The battery management system of claim 1, wherein each of the plurality of sensor ID units comprise an optical reader.

17. The battery management system of claim 1, wherein each of the plurality of sensor ID units comprise an RFID reader/writer.

18. The battery management system of claim 1, wherein each of the plurality of sensor ID units are selectively positioned in a facility.

19. The battery management system of claim 18, wherein at least one of the plurality of sensor ID units is positioned proximate a charger stand.

\* \* \* \* \*